Patented May 27, 1941

2,243,207

UNITED STATES PATENT OFFICE 2,243,207

INSECTICIDAL COMPOSITION

Edward Harvill, Yonkers, N. Y., assignor to Boyce Thompson Institute for Plant Research, Inc., a corporation of New York No Drawing. Application April 18, 1940,
Serial No. 330,317

6 Claims. (Cl. 167—24)

This invention relates to insecticidal compositions containing pyrethrum, and has for its object the provision of an improved composition of this type.

Insecticidal compositions containing pyrethrum are widely used in combating insect pests, such as flies, mosquitoes, moths, gnats and the like. Commonly, the pyrethrum is dissolved in a solvent base of the hydrocarbon or mineral oil type such as odorless kerosene, naphtha etc. While these insecticidal compositions have good toxic properties and are well-suited for the control of house flies and the like, they are expensive due to the cost of the pyrethrum. Various synthetic products have been proposed as pyrethrum substitutes, but relatively high concentrations of these products are usually required for effective toxic action, and for this reason they offer little economic advantage.

I have discovered that ortho-cyclohexyl phenol, while possessing some toxic properties itself, has the property of synergistically modifying the toxicity of pyrethrum to a decidedly advantageous extent. Thus, I have found that ortho-cyclohexyl phenol when incorporated with pyrethrum in an ordorless kerosene base produces an insecticide which is more effective against the ordinary housefly than can be accounted for on the basis of the combined pyrethrum (pyrethrin) content and ortho-cyclohexyl phenol content. Based on these discoveries, the present invention contemplates an improved insecticidal composition containing pyrethrum and ortho-cyclohexyl phenol. In its preferred form, the composition is in the form of an insecticidal spray having a mineral oil base in which the pyrethrum and ortho-cyclohexyl phenol are mutually soluble, and containing, if desired, other solvents in which ortho-cyclohexyl phenol is soluble and which are themselves soluble in the mineral oil base.

Throughout this specification and the appended claims "pyrethrum" is to be understood as covering the toxic constituent or content of pyrethrum flowers and the like, including the so-termed extracts of pyrethrum, pyrethrin etc. Ortho-cyclohexyl phenol is a compound which may be represented by the following structural formula:

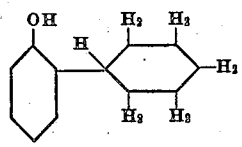

The insecticidal compositions of the invention may be prepared by dissolving the pyrethrum and ortho-cyclohexyl phenol in a mineral oil base such as odorless kerosene, naphtha etc. Ortho-cyclohexyl phenol is fairly soluble in such bases. Relatively high concentrations of ortho-cyclohexyl phenol in such bases can be obtained by first dissolving the ortho-cyclohexyl phenol in a suitable solvent thereof which is itself soluble in the mineral oil base. Among such solvents may be mentioned ethylene glycol monoethylether, ethylene glycol monomethylether, alcohol etc. The composition may advantageously contain from about 0.05 to 0.1 percent or more of pyrethrum, e. g. the commercially common pyrethrum extract used in this art, and from about 1 to 2 percent or more of ortho-cyclohexyl phenol.

The following examples illustrate the effectiveness of various insecticidal compositions of the invention. The effectiveness of the compositions was determined by the standard Peet-Grady method with five-day-old flies as described at pages 92 to 98 of "Pyrethrum Flowers" by C. B. Gnadinger, 1936 edition. Concentrations are expressed in the examples in grams per 100 cc. of solution at room temperatures. The official test insecticide (O. T. I.) which served as the standard of comparison contained 0.1% pyrethrum in the same mineral oil base as the other compositions.

| Composition No. | Conc. ortho-cyclohexyl-phenol | Conc. pyrethrum | Knock-down 10 min. | Kill 24 hours | Number of flies | Rating | O. T. I. kill 24 hours | Conc. ethylene glycol monoethyl ether |
|---|---|---|---|---|---|---|---|---|
| | Grams | Grams | Percent | Percent | | | Percent | Grams |
| 1 | 2 | 0.05 | 99.7 | 73.5 | 660 | AA | 50.2 | 4.6 |
| 2 | 1 | 0.10 | 99.7 | 72.8 | 538 | AA | 47.7 | 4.6 |
| 3 | 1 | 0.05 | 97.9 | 46.3 | 505 | B | 47.7 | 4.6 |
| 4 | 2 | 0.05 | 98.9 | 74.4 | 541 | AA | 47.7 | 4.6 |
| 5 | 2 | 0.025 | 94.8 | 32.6 | 476 | Below B | 43.8 | 4.6 |
| 6 | 2 | | None | 12.3 | 398 | | 43.8 | 4.6 |
| 7 | | 0.05 | 96.3 | 15.7 | 394 | | 43.8 | |

It will be seen from the foregoing table that the composition containing pyrethrum alone (No. 7) gave a 24-hour kill of 15.7%, while the composition containing orthocyclohexyl phenol and ethylene glycol monoethyl ether (No. 6) gave a 24-hour kill of 12.3%. When the same amounts of pyrethrum, ortho-cyclohexyl phenol and ether were combined in the same composition (Nos. 1 and 4) the 24-hour kill was 73.5% and 74.4%, or more than 2½ times the kill that would be expected on the basis of the combined content of pyrethrum and ortho-cyclohexyl phenol. In other words, the inclusion of 2% of ortho-cyclohexyl phenol in the composition containing 0.05% pyrethrum increased the kill from 15.7% to 73.5% and 74.4%, and the boosting or activating effect of the ortho-cyclohexyl phenol upon the pyrethrum is greatly in excess of what would be expected on the basis of the toxic effect of ortho-cyclohexyl phenol.

In the preparation of insecticidal sprays, it is usually desirable to dissolve the ortho-cyclohexyl phenol in the secondary solvent, e. g. ethylene glycol monoethyl ether, and then add the resulting mixture to a naphtha or kerosene base up to the concentration desired. In accordance with the invention, the toxic effect of the pyrethrum may be substantially increased by the ortho-cyclohexyl phenol to produce an exceptionally deadly insecticide, or the pyrethrum may be in part replaced by the less costly ortho-cyclohexyl phenol to produce an insecticide of the usual standard toxicity at a lower cost.

I claim:

1. An insecticidal composition containing pyrethrum and ortho-cyclohexyl phenol.
2. An insecticidal composition comprising pyrethrum and ortho-cyclohexyl phenol dissolved in a mutual solvent.
3. An insecticidal composition comprising a mineral oil base, pyrethrum and ortho-cyclohexyl phenol.
4. An insecticidal composition comprising a mineral oil base, pyrethrum, ortho-cyclohexyl phenol and a secondary organic solvent soluble in the mineral oil base and in which ortho-cyclohexyl phenol is soluble.
5. An insecticidal composition comprising a mineral oil base, pyrethrum, ortho-cyclohexyl phenol and ethylene glycol monoethyl ether.
6. An insecticidal composition comprising a mineral oil base, 0.05 to 0.1% pyrethrum, 1 to 2% ortho-cyclohexyl phenol and a secondary organic solvent soluble in the mineral oil base and in which ortho-cyclohexyl phenol is soluble.

EDWARD HARVILL.